3,024,217
RUBBER ANTIOXIDANT
Richard W. Kibler, Cuyahoga Falls, Ohio, assignor to The Firestone Tire & Rubber Company, Akron, Ohio, a corporation of Ohio
No Drawing. Filed June 25, 1959, Ser. No. 822,724
14 Claims. (Cl. 260—45.8)

This invention relates to an improved antioxidant for diene rubbers. The antioxidant is a sulfide reaction product of N,N'-diphenyl-p-phenylenediamine or one of its ring-substituted methyl or ethyl derivatives, and one or more substituted dihydroquinolines of the formula

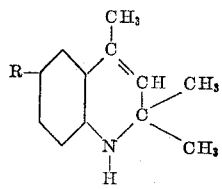

in which R is from the class consisting of hydrogen, alkyl, cycloalkyl and alkoxy groups containing up to substantially 20 carbon atoms. The invention includes the reaction products, their preparation, their use in vulcanizing diene rubber, and cross-linked diene rubber containing them as antioxidants.

2,2,4-trimethyl-1,2-dihydroquinoline will be referred to herein as TDHQ; and the above 6-alkyl, 6-cycloalkyl and 6-alkoxy derivatives will be referred to as 6-ATDHQ's. N,N'-diphenyl-p-phenylenediamine and its ring-substituted methyl and ethyl derivatives will be referred to herein as DPPD. The various derivatives include, for example:

N-phenyl-N'-tolyl-p-phenylenediamine
N-phenyl-N'-tolyl-p-toluylenediamine
N,N'-diphenyl-p-toluylenediamine
N,N'-ditolyl-p-toluylenediamine
N,N'-ditolyl-p-phenylenediamine
N-tolyl-N'-ethylphenyl-p-phenylenediamine
N,N'-diphenyl-p-ethylphenylenediamine
N,N'-dixylyl-p-phenylenediamine
N,N'-methylethylphenyl-p-phenylenediamine
N-tolyl-N'-diethylphenyl-toluylenediamine All tolyl, xylyl, ethylphenyl, diethylphenyl and methylphenylphenyl isomers are included in the foregoing.

DPPD is known as a good antioxidant especially for the prevention of cracking produced by flexing, but it has low solubility in rubber, only about 0.3 part in 100 parts of natural rubber, and about the same in SBR. It is difficultly soluble in all diene rubbers. TDHQ and the 6-ATDHQ's are good antioxidants, and certain 6-ATDHQ's are used commercially. It is known that the 6-ATDHQ's which contain alkyl groups having 1 to about 18 carbon atoms in the alkyl substituent, have been used experimentally. The sulfide reaction products of any one of the compounds of the above general formula with DPPD are soluble in rubber, in an amount substantially in excess of about 0.3 part of the combined DPPD per 100 parts of the rubber, which is the solubility of DPPD in natural rubber.

The antioxidants of this invention are prepared by reacting TDHQ or a 6-ATDHQ and DPPD with sulfur dichloride in an organic solvent solution, and aqueous alkali is used to produce a 2-phase system and to neutralize HCl which is formed. The reaction products are readily soluble in rubber and make possible the solution of substantially more DPPD in the rubber in combined form than is possible in uncombined form. The proportion of the reactants used in producing the reaction products may be varied, and 1 to 3 or more mols of the substituted dihydroquinoline may be used for each mol of DPPD. The number of mols of $SCl_2$ entering into the reaction is equal to the sum of 0.5 to 1 times the number of mols of DPPD plus 0.5 to 2 times the number of mols of TDHQ or 6-ATDHQ entering into the reaction. When the number of mols of $SCl_2$ equals more than the sum of the number of mols of DPPD plus the number of mols of TDHQ or 6-ATDHQ, the excess $SCl_2$ reacts to form complex structures involving carbon-sulfur linkages with ring carbons of the substituted dihydroquinoline molecules which have already reacted with $SCl_2$.

The sulfur dichloride reaction products of TDHQ or 6-ATDHQ and DPPD contain one or more of the sulfides represented by the following formulae depending upon the mol ratio of the TDHQ or 6-ATDHQ to the DPPD in the reaction mixture.

If equimolecular proportions of the TDHQ or 6-ATDHQ and DPPD are reacted in the presence of adequate sulfur dichloride, compounds represented by both of the following formulae will be obtained, namely

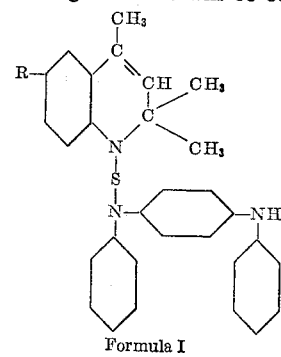

Formula I and

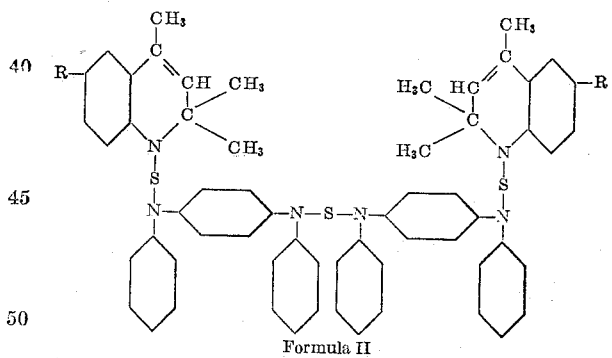

Formula II in which R is hydrogen or an alkyl, cycloalkyl or alkoxy group which contains 1 to substantially 20 carbon atoms.

If two mols of TDHQ or 6-ATDHQ are reacted with one mol of DPPD and two mols of sulfur dichloride the following compound predominates in the reaction mixture:

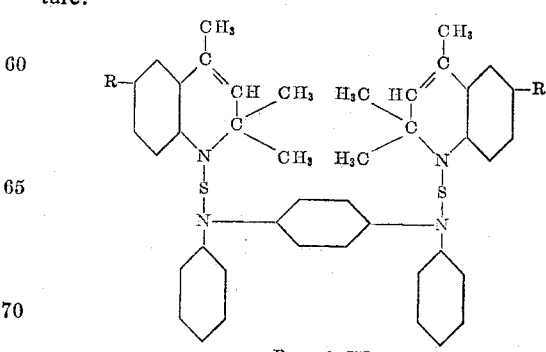

Formula III in which R is hydrogen or an alkyl, cycloalkyl or alkoxy group containing 1 to substantially 20 carbon atoms.

It is understood that any one or more rings of the diphenyl-p-phenylenediamine grouping may be methyl- or ethyl-substituted in the foregoing formulae, and in Formula II the two DPPD groups may be the same or different.

In Formulae II and III the R's are preferably the same, but may be quite different, as when a mixture of 6-ATDHQ's or 6-ATDHQ and 6-TDHQ is used in the reaction.

The reaction products described herein which were derived from a 6-alkyl TDHQ contain a mixture of 6-alkyl derivatives having average carbon contents in the alkyl groups, as indicated. Throughout the specification and claims the naming of a specific number of carbon atoms in connection with alkyl and alkoxy groups in such compounds will refer to average numbers of carbon atoms.

Sufficient caustic or other strong alkali is present to react with the liberated HCl.

The alkyl or alkoxy substituent of the 6-ATDHQ may, for example, be any of the following:

| | |
|---|---|
| Methyl | Eicosoxy |
| Ethyl | Ethylcyclohexyl |
| Propyl | Hexadecyl |
| Butyl | Benzyl |
| Pentyl | Cyclohexenyl |
| Hexyl | Allyl |
| Heptyl | Methoxy |
| Octyl | Ethoxy |
| Nonyl | Propoxy |
| Decyl | Butoxy |
| Dodecyl | Pentoxy |
| Octadecyl | Hexoxy |
| Cyclohexyl | Heptoxy |
| Cyclopentyl | Octoxy |
| Methylcyclohexyl | Nonoxy |
| Methylcyclopentyl | Decoxy |
| Isobornyl | Dodecoxy |
| Eicosyl | Octadecoxy |

The various isomers are included in the foregoing.

The dihydroquinoline derivatives can be made as follows, using alkyl, cycloalkyl and alkoxy reactants of different chain lengths to produce desired products. They are preferably prepared starting with benzene or the appropriate alkyl, cycloalkyl or alkoxy benzene. This is nitrated, and the para-nitro compound is reduced and the resulting aromatic amine is reacted with acetone, following the known procedure for the preparation of 2,2,4-trimethyl-1,2-dihydroquinoline and 6-alkyl derivatives thereof.

The following example is typical of the preparation of the sulfide reaction products of this invention:

EXAMPLE I

A solution of 130 g. (0.38 mol) of 6-dodecyl 2,2,4-trimethyl-1,2-dihydroquinone in 600 ml. of benzene was placed in a two-liter, three-neck flask. The solution was heated to 70° C. and 50 g. (0.19 mol) of N,N'-diphenyl-p-phenylenediamine was added with stirring. Then 39.14 g. (0.38 mol) of sulfur dichloride dissolved in 50 ml. of benzene was added dropwise, with stirring. Simultaneously a solution of 30.4 g. (0.76 mol) of NaOH in 200 ml. of water was added dropwise. The addition was regulated so that the temperature remained at 70° C. without the addition of heat to the system. Alternatively, it may be added more slowly with heating. The additions were carried out simultaneously, with stirring, over a 40-minute period. The reaction mixture was then stirred an additional hour while it was maintained at 70° C., and it was then cooled and the aqueous layer was separated from the reaction mixture. The remaining benzene solution of the reaction product was then washed twice with 200 ml. of water and the benzene was distilled off at atmospheric pressure until the temperature of the reaction mixture reached 110° C. The pressure was then gradually reduced until the final stripping conditions of 130° C. at 50 mm. were reached, and distillation was continued for one hour under these conditions. The black product produced was poured hot into a bottle and cooled to room temperature, at which it was a very viscous liquid. The yield was 170 grams. The product had a theoretical sulfur content of 6.3 percent.

The ratio of the reactants may be varied as described, and unsubstituted or different 6-alkyl or 6-alkoxy TDHQ's may be utilized, as well as unsubstituted or substituted DPPD. The reaction can be carried out at different temperatures as, for example, in a range from 30° C. to 75° C. when benzene is used as a solvent. Different means for neutralizing the reaction mixture may be employed. For instance, alkali metal and alkaline earth metal hydroxides and carbonates, ammonia, highly basic amines, etc. may be used.

Following this general method of preparation, different reaction products were produced using different proportions of the reactants, and the following table gives the proportions of reactants and caustic used, together with the theoretical sulfur content of each reaction product, and recommends an amount to be used as an antioxidant in rubber. The recommended amount is found also in the tables of test data that follow. It is to be understood that the preferred amount listed in the table (expressed in parts per 100 parts of rubber) may be varied over a relatively wide range, and for different rubbers, different amounts may be preferred, so that the amount of 6-alkyl TDHQ present is within the general range usually employed for antioxidant use.

It is noted that no more than 0.3 part of DPPD are soluble in 100 parts of rubber and by this invention the DPPD is added in a combined form, in which much more DPPD is soluble in the rubber than in the uncombined form, resulting in increased antioxidant effectiveness (particularly for prevention of flex cracking).

Table A refers to different reaction products produced from 6-ATDHQ in which A is an alkyl group which contains about 12 carbon atoms, using different proportions of the 6-ATDHQ and DPPD.

*Table A*

| Mols 6-ATDHQ | Mols DPPD | Mols SCl₂ | Mols NaOH | Percent sulfur | Amount preferred for use in rubber, phr. |
|---|---|---|---|---|---|
| 1 | 1 | 1.5 | 3.0 | 7.4 | 1.9 to 2.5 |
| 2 | 1 | 2.0 | 4.0 | 6.5 | 2.9 to 3.9 |
| 3 | 1 | 2.5 | 5.0 | 6.0 | 3.9 to 5.2 |
| 2.5 | 1 | 6.0 | 12.0 | 14.0 | 4.0 to 5.0 |

The PPD was unsubstituted in each reaction. The various reaction products were viscous liquids except that identified in the last line and this was a brittle solid. The brittle product is representative of the solid type obtained with a high ratio of SCl₂, as discussed above. The reaction products of the foregoing table were all soluble in rubber in the amounts given, and the cross-linked rubbers obtained from them were free from bloom.

EXAMPLE II 2,2,4-trimethyl-1,2-dihydroquinoline (43.25 g.) (0.25 mol) was dissolved in 600 ml. benzene and the solution placed in a 2-liter, 3-neck flask, stirred and heated to 70° C. N,N'-diphenyl-p-phenylenediamine (65 g.) (0.25 mol) was added and the resulting mixture was stirred for 20 minutes at 70° C. SCl₂ (25.75 g.) (0.25 mol) dissolved in benzene to make 150 ml. of solution was added dropwise with stirring. Simultaneously, NaOH (20 g.) (0.5 mol) dissolved in 150 ml. water was added dropwise at an equal rate. The temperature was maintained in the range 70 to 75° C. during the reaction time. The additions were complete in 35 minutes and the reaction mixture was stirred an additional 30 minutes. The reaction mixture was then cooled and filtered to remove 10 g. of solid sulfide of the DPPD separated from solution during the reaction. The aqueous layer was separated and the benzene layer washed with a solution of 35 g. NaOH in 150 ml. water. The benzene was distilled off down to the final stripping conditions of 130° C./35 mm. and held for 20 minutes. The product was then poured out and cooled to a viscous liquid (106 g.) (92% yield). On analysis, 7.03% of sulfur was found. The theoretical is 6.95% sulfur. The amount preferred for antioxidant use is 1.0 to 3.0 parts per 100 parts of the rubber polymer.

EXAMPLE III 6-ethoxy-2,2,4-trimethyl-1,2-dihydroquinoline (54.5 g.) (0.25 mol) was dissolved in 400 ml. benzene and the solution was placed in a 2-liter, 3-neck flask, and heated to 70° C. with stirring. N,N'-diphenyl-p-phenylenediamine (32.5 g.) (0.125 mol) was added and the resulting mixture was stirred for 20 minutes at 70° C. $SCl_2$ (25.75 g.) (0.25 mol) dissolved in benzene to make 150 ml. of solution was added dropwise with stirring. Simultaneously, NaOH (20 g.) (0.5 mol) dissolved in 150 ml. water was added dropwise at an equal rate. The temperature was maintained in the range of 70–75° C. during the reaction time. The additions were complete in 40 minutes and the reaction mixture was stirred an additional 30 minutes. The reaction mixture was then cooled, filtered, and the aqueous layer separated. The benzene layer was washed with a solution of 35 g. NaCl in 150 ml. water. The benzene was distilled off down to the final stripping conditions of 130° C./35 mm. and held for 20 minutes. The product was then poured out and cooled to a brittle, friable solid (89 g., 94% yield). On analysis the theoretical sulfur content of 8.5 was found. The amount preferred for antioxidant use is 1.5 to 4 parts per 100 parts of rubber polymer.

EXAMPLE IV

N-phenyl-N'-o-tolyl-p-phenylenediamine (41.3 g.) (0.15 mol) and 6-dodecyl-2,2,4-trimethyl-1,2-dihydroquinoline (51.5 g.) (0.15 mol) were placed in a 2-liter, 3-neck flask. Benzene (850 ml.) was added and the resulting mixture was stirred and heated to 70° C. A solution of sulfur dichloride (23.17 g.) (0.225 mol) in 150 ml. benzene was added dropwise with stirring. Simultaneously a solution of sodium hydroxide (18 g.) (0.45 mol) in 116 ml. water was added dropwise at an equal rate during 1 hour 45 minutes during which the temperature remained at 65 to 70° C. After the additions were complete, the batch was stirred an additional hour at 68° C., cooled and the aqueous layer separated. The benzene layer was washed with a solution of 50 g. NaCl in 250 ml. water. The benzene was then stripped off until the final stripping conditions of 135° C./35 mm. were obtained and held for 30 minutes. The batch was then poured out and cooled to a viscous liquid which weighed 94.5 g. (95% yield). The sulfur content is in the range 7.0 to 7.5%.

The examples are illustrative. The reaction can be carried out in any suitable organic solvent. The temperature of the reaction is not critical and temperatures of 30° C. up to the refluxing temperature of the solvent may be employed, and although ordinarily the reaction is carried out at atmospheric pressure, super atmospheric pressures may be used in which case the refluxing temperature will be higher than normally.

The invention will be further described in connection with use of the reaction products in rubber stocks prepared from a masterbatch having the following composition. The average number of carbon atoms in the alkyl groups in the 6-alkyl TDHQ's is indicated by a subscript, thus: 6-$C_{12}$TDHQ, etc. The various antioxidants were added in the amounts indicated in the following tables which refer to the properties of the various vulcanizates obtained using different amounts of different antioxidants.

MASTER BATCH

| | Parts by weight |
|---|---|
| Natural rubber | 100.0 |
| HAF Black | 50.0 |
| Zinc oxide | 3.0 |
| Extender | 3.0 |
| Stearic acid | 2.6 |
| Retarder | 1.0 |
| Sulfur | 2.6 |
| Accelerator | 0.5 |
| Total | 162.7 |

The amount of combined DPPD in each tested antioxidant is given in parenthesis in the following tables at the head of the respective columns. The tables record the normal physical properties of the vulcanizates and note change in these properties after each of two different aging tests, namely, in an air oven and in an oxygen bomb.

The control used was a mixture of (1) 1.4 parts per hundred of 6-dodecyl-2,2,4-trimethyl-1,2-dihydroquinoline and (2) 0.4 part per hundred of a fused mixture of 75% of N,N'-diphenyl-p-phenylenediamine and 25% of 6-dodecyl-2,2,4-trimethyl-1,2-dihydroquinoline. The mixture includes a total of 0.3 part of N,N'-diphenyl-p-phenylenediamine, approximately the maximum that can be used without blooming, plus 1.5 parts of 6-$C_{12}$TDHQ which gives a good antioxidant effect when used alone. Any antioxidizing amount of the reaction products can be used, such as, for example, 0.1 to 10 parts per 100 parts of rubber, the amount given in the examples being illustrative.

Table I records the results obtained using different amounts of the antioxidant described in line 1 of Table A.

*Table I*

| | Control | Mole ratio 6-ATDHQ/DPPD | | |
|---|---|---|---|---|
| | | 1:1 | 1:1 | 1:1 |
| Antioxidant (phr.) | | 1.25 (0.5 DPPD) | 1.90 (0.75 DPPD) | 2.5 (1.0 DPPD) |
| Normal properties: | | | | |
| Tensile (p.s.i.) | 4,025 | 3,900 | 3,700 | 4,075 |
| 300% modulus (p.s.i.) | 2,000 | 1,775 | 1,600 | 2,000 |
| Elongation (percent) | 520 | 530 | 560 | 530 |
| Aged properties (2 days at 212° F.): | | | | |
| Tensile | 2,750 | 2,625 | 2,500 | 2,650 |
| 300% modulus | 2,250 | 2,275 | 2,200 | 2,300 |
| Elongation | 360 | 340 | 340 | 340 |
| Aged properties (96 hrs. oxygen bomb): | | | | |
| Tensile | 2,975 | | | 3,275 |
| 300% modulus | 2,000 | | | 2,100 |
| Elongation | 440 | | | 470 |
| Cure: | | | | |
| Time (min.) | 45 | 25 | 25 | 25 |
| Temperature (° F.) | 280 | 280 | 280 | 280 |
| Crack initiation [1] | Fair | Good | Good | Good |
| Sidewall flexing test— (Aged 1 day at 150° F.): [2] | | | | |
| Number strips broken | 3 | 3 | 4 | 0 |
| Average flex life (hrs.) | 10.6 | 10.4 | 10.1 | 11.5 |
| Cracks per hour | 7.6 | 10.0 | 7.6 | 4.3 |

[1] Samples of the unaged stocks were grooved with a single groove to simulate a tread cross section and the stocks and control were then flexed for 24 or 36 hours, depending upon how fast it was seen that deterioration had set in. The stocks were then visually inspected and rated arbitrarily: Poor, Fair to Poor, Fair, Fair to Good, or Good, depending upon the number and size of the cracks developed. The test is described in "Tread Cracking of Natural and Synthetic Rubbers" by Irven B. Prettyman in Industrial and Engineering Chemistry, volume 36, page 29 (January 1944).
[2] Four ½-inch dumbbell strips 0.100 gauge were aged 1 day each at 158° F. and then flexed with 0–75% elongation until half the strips of the series were broken or 15 hours maximum. The cracks developed were then counted and cracks per hour determined by dividing the average number of cracks in 4 test strips by the average flex life for the 4 strips.

The results recorded in Table I, show that when the antioxidant is derived from equimolecular amounts of the reactants with properties given in the first line of Table A, the preferred cure (that is, the one in which the fewest number of cracks per hour were produced when the stocks were subjected to the sidewall-cracking test) was obtained with 1.90 parts of the reaction mixture when curing for 25 minutes at 280° F. This is within the preferred range indicated in the last column of Table A.

Table II refers to tests with the product described in line 2 of Table A.

Table II

|  | Control | Mole ratio 6-ATDHQ/DPPD | | |
|---|---|---|---|---|
|  |  | 2:1 | 2:1 | 2:1 |
| Antioxidant (phr.) |  | 1.9 (0.5 DPPD) | 2.9 (0.75 DPPD) | 3.9 (1.0 DPPD) |
| Normal properties: |  |  |  |  |
| Tensile (p.s.i.) | 3,950 | 4,075 | 4,025 | 3,775 |
| 300% modulus (p.s.i.) | 2,075 | 1,950 | 2,125 | 1,850 |
| Elongation (percent) | 510 | 530 | 500 | 540 |
| Aged properties (2 days at 212° F.): |  |  |  |  |
| Tensile | 2,850 | 2,950 | 2,650 | 2,750 |
| 300% modulus | 2,325 | 2,375 | 2,450 | 2,250 |
| Elongation | 370 | 370 | 320 | 360 |
| Aged properties (96 hrs. oxygen bomb): |  |  |  |  |
| Tensile | 2,800 | 2,850 | 2,750 | 2,850 |
| 300% modulus | 1,850 | 1,750 | 1,975 | 1,700 |
| Elongation | 460 | 520 | 440 | 520 |
| Cure: |  |  |  |  |
| Time (min.) | 40 | 35 | 40 | 30 |
| Temperature (° F.) | 280 | 280 | 280 | 280 |
| Crack initiation | Poor | Good | Fair | Good |

Using the compound described in line 2 of Table A, better cracking properties as determined by the crack initiation test were obtained, as shown in Table II.

The results recorded in Table III were obtained with the same reaction product as used in obtaining the results recorded in Table II, namely that described in line 2 of Table A. Improved cracking properties were obtained as determined by the sidewall flexing test shown in Table III.

Table III

|  | Control | Mole ratio 6-ATDHQ/DPPD | | | |
|---|---|---|---|---|---|
|  |  | 2:1 | 2:1 | 2:1 | 2:1 |
| Antioxidant (phr.) |  | 2.0 (0.5 DPPD) | 3.0 (0.75 DPPD) | 4.0 (1.0 DPPD) | 5.0 (1.25 DPPD) |
| Normal properties: |  |  |  |  |  |
| Tensile (p.s.i.) | 4,500 | 4,375 | 4,375 | 4,400 | 4,250 |
| 300% modulus (p.s.i.) | 2,025 | 2,200 | 2,000 | 2,000 | 1,950 |
| Elongation (percent) | 540 | 530 | 520 | 550 | 530 |
| Aged properties (2 days at 212° F.): |  |  |  |  |  |
| Tensile | 2,650 | 2,575 | 2,800 | 2,750 | 2,725 |
| 300% modulus | 2,000 | 2,225 | 2,250 | 2,200 | 2,200 |
| Elongation | 390 | 350 | 380 | 370 | 370 |
| Aged properties (96 hrs. oxygen bomb): |  |  |  |  |  |
| Tensile | 2,925 | 3,100 | 3,300 | 3,325 | 3,325 |
| 300% modulus | 1,650 | 1,900 | 2,000 | 2,075 | 2,025 |
| Elongation | 460 | 460 | 460 | 470 | 460 |
| Cure: |  |  |  |  |  |
| Time (min.) | 40 | 40 | 40 | 40 | 40 |
| Temperature (° F.) | 280 | 280 | 280 | 280 | 280 |
| Sidewall flexing test—(Aged 1 day at 158° F.): |  |  |  |  |  |
| Number strips broken | 2 | 0 | 0 | 0 | 0 |
| Average flex life (hrs.) | 14.2 | 15.0 | 15.0 | 15.0 | 15.0 |
| Cracks per hour | 5.8 | 4.2 | 2.8 | 2.4 | 4.2 |

Table IV

|  | Control | Mole ratio 6-ATDHQ/DPPD | | |
|---|---|---|---|---|
|  |  | 3:1 | 3:1 | 3:1 |
| Antioxidant (phr.) |  | 2.6 (0.5 DPPD) | 3.9 (0.75 DPPD) | 5.2 (1.0 DPPD) |
| Normal properties: |  |  |  |  |
| Tensile (p.s.i.) | 3,800 | 4,000 | 3,975 | 4,025 |
| 300% modulus (p.s.i.) | 1,700 | 1,675 | 1,725 | 1,800 |
| Elongation (percent) | 550 | 580 | 570 | 550 |
| Aged properties (2 days at 212° F.): |  |  |  |  |
| Tensile | 2,775 | 2,725 | 2,700 | 2,825 |
| 300% modulus | 2,175 | 2,225 | 2,200 | 2,150 |
| Elongation | 390 | 360 | 370 | 390 |
| Aged properties (96 hrs. oxygen bomb): |  |  |  |  |
| Tensile | 2,800 | 3,100 | 3,300 | 3,300 |
| 300% modulus | 1,500 | 1,700 | 1,775 | 1,850 |
| Elongation | 480 | 500 | 520 | 510 |
| Cure: |  |  |  |  |
| Time (min.) | 30 | 30 | 30 | 30 |
| Temperature (° F.) | 280 | 280 | 280 | 280 |
| Crack initiation | (¹) | (¹) | Good | Good |
| Sidewall flexing test—(Aged 1 day at 158° F.): |  |  |  |  |
| Number strips broken | 4 | 2 | 0 | 0 |
| Average flex life (hrs.) | 9.7 | 11.2 | 11.4 | 11.4 |
| Cracks per hour | 7.3 | 7.4 | 3.9 | 4.3 |

¹ Fair to good.

In Table IV, the reaction product described in line 3 of Table A was employed in varying amounts. That which contained 3.9 parts per hundred of reacted DPPD gave the best stock, as determined by the sidewall flexing test, and this is the recommended amount given in the last column of Table A.

Table V

|  | Control | Mole ratio 6-ATDHQ/DPPD | | | |
|---|---|---|---|---|---|
|  |  | 2.5:1 | 2.5:1 | 2.5:1 | 2.5:1 |
| Antioxidant (phr.) |  | 2.0 (0.4 DPPD) | 3.0 (0.6 DPPD) | 4.0 (0.8 DPPD) | 5.0 (1.0 DPPD) |
| Normal properties: |  |  |  |  |  |
| Tensile (p.s.i.) | 4,800 | 4,775 | 4,900 | 4,800 | 4,850 |
| 300% modulus (p.s.i.) | 2,375 | 2,600 | 2,700 | 2,600 | 2,650 |
| Elongation (percent) | 510 | 500 | 500 | 490 | 510 |
| Aged properties (2 days at 212° F.): |  |  |  |  |  |
| Tensile | 2,750 | 2,525 | 2,875 | 2,875 | 2,850 |
| 300% modulus | 2,400 |  | 2,675 | 2,675 | 2,650 |
| Elongation | 340 | 280 | 330 | 320 | 330 |
| Aged properties (96 hrs. oxygen bomb): |  |  |  |  |  |
| Tensile | 2,900 | 3,400 | 3,325 | 3,250 |  |
| 300% modulus | 1,900 | 2,400 | 2,325 | 2,425 |  |
| Elongation | 440 | 440 | 440 | 420 |  |
| Cure: |  |  |  |  |  |
| Time (min.) | 40 | 40 | 40 | 40 | 40 |
| Temperature (° F.) | 280 | 280 | 280 | 280 | 280 |
| Sidewalk flexing test—(Aged 1 day at 158° F.): |  |  |  |  |  |
| Number strips broken | 3 | 0 | 0 | 0 | 1 |
| Average flex life (hrs.) | 14.1 | 15.0 | 15.0 | 15.0 | 14.8 |
| Cracks per hour | 6.4 | 1.9 | 2.5 | 1.6 | 1.2 |

In obtaining the results recorded in Table V, the reaction product described in the last line of Table A was used.

Table VI gives the results of cures with the same masterbatch using the reaction products of Examples II and III identified simply as Example II and Example III.

Table VI

|  | Control | Ex. II | Ex. III |
|---|---|---|---|
| Antioxidant (phr.) | | | |
| Normal properties: | | | |
|   Tensile (p.s.i.) | 4,025 | 3,975 | 4,150 |
|   300% modulus (p.s.i.) | 1,725 | 2,025 | 1,900 |
|   Elongation (percent) | 570 | 520 | 570 |
| Aged properties (2 days at 212° F.): | | | |
|   Tensile (p.s.i.) | 2,775 | 2,550 | 2,900 |
|   300% modulus (p.s.i.) | 2,025 | 2,175 | 2,300 |
|   Elongation (percent) | 420 | 300 | 320 |
| Aged properties (96 hrs. oxygen bomb): | | | |
|   Tensile (p.s.i.) | 2,975 | 3,175 | 3,050 |
|   300% Modulus (p.s.i.) | 1,775 | 2,000 | 1,925 |
|   Elongation (percent) | 520 | 480 | 470 |
| Cure: | | | |
|   Time (min.) | 40 | 40 | 40 |
|   Temperature (° F.) | 280 | 280 | 280 |
| Crack initiation | Fair | Fair | Fair+ |

The cure of the control and both test samples was for 40 minutes at 280° F. although a comparison of the normal properties, such as the modulus, shows that the test samples cured more rapidly than the control. Even so, the periods of crack initiation compare favorably. The tensile after the oxygen bomb test was superior.

Table VII gives the results of cures with the same masterbatch using the reaction product of Example IV, identified as Ex. 4.

Table VII

|  | Control | Ex. 4 |
|---|---|---|
| Antioxidant (phr.) | | 1.9 |
| Normal properties: | | |
|   Tensile (p.s.i.) | 4,050 | 4,175 |
|   300% modulus (p.s.i.) | 1,875 | 2,025 |
|   Elongation (percent) | 530 | 520 |
| Aged properties (2 days at 212° F.): | | |
|   Tensile (p.s.i.) | 2,825 | 2,800 |
|   300% modulus (p.s.i.) | 2,175 | 2,375 |
|   Elongation (percent) | 380 | 360 |
| Aged properties (96 hrs. oxygen bomb): | | |
|   Tensile (p.s.i.) | 3,100 | 3,200 |
|   300% modulus (p.s.i.) | 1,925 | 2,175 |
|   Elongation (percent) | 450 | 430 |
| Cure: | | |
|   Time (min.) | 40 | 40 |
|   Temperature (° F.) | 280 | 280 |
| Crack initiation | Fair+ | (1) |
| Sidewall flexing test—(Aged 1 day at 158° F.): | | |
|   Number strips broken | 4 | 1 |
|   Average flex life (hrs.) | 12 | 13.4 |
|   Cracks per hour | 11.2 | 10.1 |

[1] Fair to good.

Referring to the results of Tables I to VII, it is evident that the main advantage in the use of the reaction products which provide a higher percentage of available DPPD than could possibly be obtained with the pure compound is that they give improved resistance to cracking due to the higher level of DPPD in the stocks. This improved resistance can be obtained without the formation of objectionable bloom on the surface of the stock such as would be obtained if DPPD were used in an unreacted condition. The improved resistance to cracking is shown by the data under the headings Crack Initiation and Sidewall Flexing Test. The ratio of the two reactants employed in making the reaction products is immaterial so long as it is within the ratio given above. The amount used can also be varied, particularly when admixed with another antioxidant.

Although the test results refer to the use of the antioxidant reaction products with natural rubbers, the invention includes the use of the antioxidants with any diene rubber, including homopolymers and copolymers of conjugated hydrocarbon dienes, copolymers of such conjugated dienes and ethylenically unsaturated monomers, and mixtures thereof, including butadiene-isoprene copolymers and rubbers identified under ASTM Designation D1418–56T in the 1956 Journal as NBR, ABR, PBR and SIR and especially natural rubber, BR, SBR, IR and IIR, etc.

Crosslinked rubber is a rubber made less soluble, less thermoplastic and more elastic by crosslinking. Crosslinking includes vulcanization or curing of a rubber, and can be accomplished by any known crosslinking agent or method. A rubber can be crosslinked by heating it with sulfur or a sulfur-bearing curing agent, preferably in the presence of a suitable accelerator, and this process is well known in the rubber art as sulfur vulcanization. Other curing agents such as selenium or tellurium can be used in conjuction with or replacing sulfur.

A different class of curing agents for rubbers includes the well known di- or poly-nitroso compounds, quinone oximes and anils, di- and poly-nitro compounds, bis- and poly-azo compounds, diazoamino compounds, and various organic peroxides, including dicumyl peroxides, for example. The rubber is usually heated with the curing agent to effect the desired crosslinking, as is known in the art. This type of curing agent can be accelerated by lead oxides, for example red lead ($Pb_3O_4$), quinone dianils, substituted phenylene-diamines, etc., as is known in the art.

Rubbers are cured also by heating admixed with a curable resin, such as a phenol-aldehyde resol or even the monomeric dimethylol- or polymethylol-phenol. The phenol is advantageously nuclearly substituted by a hydrocarbon radical. An example of this type of curing agent is the resol formed by condensing a molar excess of formaldehyde with p-tt-octylphenol in the presence of an alkaline catalyst.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e.g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-dialkyldithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene-dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization of a suitably activated rubber composition does take place at lower temperatures such as at room temperature. For example, a latex film containing a sulfur curing agent and an activated ultra accelerator can be cured by allowing the film to remain at room temperature for several hours or a few days.

The invention is covered in the following claims.

What I claim is:

1. The neutralized monosulfide reaction products of (1) one mole of a phenylenediamine from the class consisting of N,N'-diphenyl-p-phenylenediamine and its ring-substituted methyl and ethyl derivatives, (2) substantially 1 to 3 mols of a substituted 1,2-dihydroquinoline of the class consisting of 2,2,4-trimethyl-1,2-dihydroquinoline, 6-alkyl-2,2,4-trimethyl-1,2-dihydroquinoline, 6-cycloalkyl - 2,2,4 - trimethyl - 1,2 - dihydroquinoline and 6-alkoxy - 2,2,4 - trimethyl - 1,2 - dihydroquinoline in which the alkyl, cycloalkyl, and alkoxy substituents contain up to substantially 20 carbon atoms and (3) an amount of sulfur dichloride equal to the sum of 0.5 to 1 times the number of mols of said phenylenediamine and 0.5 to 2 times the number of mols of the dihydroquinoline, which reaction product is obtained by heating a solution of the reactants in a liquid organic solvent in which the reactants are soluble, the solvent being neutral under the conditions of the reaction, at a temperature between 30° C. and the refluxing temperature of the solvent and which is substantially free of hydrogen chloride.

2. The product of claim 1 in which the dihydroquinoline derivative used is 6-substituted with an alkyl group which contains substantially 12 carbon atoms and the phenylenediamine is N,N'-diphenyl-p-phenylenediamine.

3. The product of claim 1 in which the dihydroquinoline derivative is 2,2,4-trimethyl-1,2-dihydroquinoline and the phenylenediamine is N,N'-diphenyl-p-phenylenediamine.

4. The product of claim 1 in which the dihydroquinoline derivative is 6-ethoxy-2,2,4-trimethyl-1,2-dihydroquinoline.

5. The product of claim 1 in which more sulfur dichloride is used than 1 mol less than the sum of the mols of the phenylenediamine and dihydroquinoline derivatives, and sulfur-to-carbon linkages are formed in addition to sulfur-to-nitrogen linkages.

6. The product of claim 1 in which the linkages between the phenylenediamine and dihydroquinoline derivatives are substantially all sulfur-to-nitrogen linkages.

7. The method of cross-linking a diene rubber which method comprises heating the rubber in the presence of a cross-linking agent and an antioxidizing amount of a reaction product of claim 1.

8. The method of vulcanizing a diene rubber which method comprises heating the rubber in the presence of a vulcanizing agent and an antioxidizing amount of a reaction product of claim 1.

9. The method of vulcanizing a diene rubber which method comprises heating the rubber with sulfur in the presence of an antioxidizing amount of the reaction product of the 6-alkyl dihydroquinoline derivative of claim 1 in which the alkyl substituent contains substantially 12 carbon atoms.

10. Vulcanized diene rubber containing an antioxidizing amount of the reaction product of claim 1.

11. Cross-linked diene rubber containing an antioxidizing amount of a reaction product of claim 1.

12. Cross-linked diene rubber containing an antioxidizing amount of a reaction product of claim 1, in which the linkages between the phenylenediamine and dihydroquinoline derivatives are substantially all sulfur-to-nitrogen linkages.

13. The process of producing a monosulfide reaction product which comprises reacting, substantially 1 mol of a phenylenediamine of the class consisting of N,N'-diphenyl-p-phenylenediamine and its ring-substituted methyl and ethyl derivatives, substantially 1 to 3 mols of a substituted 1,2-dihydroquinoline of the class consisting of 2,2,4 - trimethyl-1,2-dihydroquinoline, 6 - alkyl - 2,2,4-trimethyl -1,2-dihydroquinoline, 6 - cycloalkyl-2,2,4-trimethyl-1,2-dihydroquinoline and 6-alkoxy-2,2,4-trimethyl-1,2-dihydroquinoline in which the alkyl, cycloalkyl and alkoxy groups contain up to substantially 20 carbon atoms, and an amount of sulfur dichloride equal to the sum of 0.5 to 2 times the number of mols of said phenylenediamine and 0.5 to 2 times the number of mols of said dihydroquinoline derivative, and neutralizing the HCl formed.

14. The process of claim 13 in which the dihydroquinoline derivative contains an alkyl substituent of substantially 12 carbon atoms and N,N'-diphenyl-p-phenylenediamine is unsubstituted.

References Cited in the file of this patent

UNITED STATES PATENTS

| | | |
|---|---|---|
| 2,713,047 | Beaver et al. | July 12, 1955 |
| 2,805,212 | Beaver et al. | Sept. 3, 1957 |
| 2,832,749 | Harris | Apr. 29, 1958 |
| 2,849,452 | Webb | Aug. 26, 1958 |
| 2,861,975 | Thompson | Nov. 25, 1958 |
| 2,941,979 | Pohle et al. | June 21, 1960 |

UNITED STATES PATENT OFFICE
CERTIFICATE OF CORRECTION

Patent No. 3,024,217                          March 6, 1962

Richard W. Kibler

It is hereby certified that error appears in the above numbered patent requiring correction and that the said Letters Patent should read as corrected below.

Column 6, Table I, first column, fourth line from the bottom of the table, for "150° F." read -- 158° F. --; column 10, line 13, for "including dicumyl peroxides" read -- including dicumyl peroxide --.

Signed and sealed this 29th day of March 1966.

SEAL)

Attest:

ERNEST W. SWIDER                      EDWARD J. BRENNER

Attesting Officer                       Commissioner of Patents